(12) United States Patent
Kruszynski et al.

(10) Patent No.: US 8,485,765 B2
(45) Date of Patent: Jul. 16, 2013

(54) INDEXABLE INSERT AND USE OF THE INDEXABLE INSERT IN A SOLID DRILL

(75) Inventors: Jacek Kruszynski, Stuttgart (DE); Uwe Kretzschmann, Besigheim (DE); Hendrik Nitzsche, Benningen (DE); Henry Schuett, Sachsenheim (DE)

(73) Assignee: Komet Group GmbH, Besigheim (DE)

( * ) Notice: Subject to any disclaimer, the term of this patent is extended or adjusted under 35 U.S.C. 154(b) by 1064 days.

(21) Appl. No.: 12/310,740

(22) PCT Filed: Aug. 31, 2007

(86) PCT No.: PCT/EP2007/059108
§ 371 (c)(1),
(2), (4) Date: Mar. 5, 2009

(87) PCT Pub. No.: WO2008/034707
PCT Pub. Date: Mar. 27, 2008

(65) Prior Publication Data
US 2009/0238649 A1 Sep. 24, 2009

(30) Foreign Application Priority Data
Sep. 19, 2006 (DE) .......................... 10 2006 044 605

(51) Int. Cl.
*B23B 51/02* (2006.01)
(52) U.S. Cl.
USPC ............ 408/223; 408/233; 408/713; 407/113
(58) Field of Classification Search
USPC ................... 408/223, 24, 231, 233, 713, 188, 408/187, 227, 230; 407/113, 114, 116
IPC .............................................. B23B 51/00,51/02
See application file for complete search history.

(56) References Cited

U.S. PATENT DOCUMENTS 4,564,813 A * 1/1986 Young et al. .................. 324/311
4,645,384 A * 2/1987 Shimomura et al. ............ 407/42
(Continued)

FOREIGN PATENT DOCUMENTS

DE 297 19 482 U1 12/1997
DE 197 09 436 C2 3/1999
(Continued)

OTHER PUBLICATIONS

Form PCT/IPEA/416 (1 page).
(Continued)

*Primary Examiner* — Daniel Howell
*Assistant Examiner* — Justin Sikorski
(74) *Attorney, Agent, or Firm* — Flynn, Thiel, Boutell & Tanis, P.C.

(57) ABSTRACT

An indexable insert for solid drills has four identical cutting edges (30) arranged at a distance above a supporting base (42) and each extending between two cutting-edge corners (28', 28'). The cutting edges are each bounded by a cutting face (46) and a clearance face (48), with the inclusion of a wedge angle (b). Of the cutting edges (30), one in each case is in an active operating position during the drilling operation. To permit optimum adaptation to the cutting conditions and drilling characteristics, varying over the length of the cutting edge of the drilling tool, it is proposed according to the invention that the height (h) of the four cutting edges (30), measured from the plane of the supporting base (42), and/or the clearance angle (a) varies over the length of the respective cutting edges (30).

22 Claims, 9 Drawing Sheets

U.S. PATENT DOCUMENTS

| | | | |
|---|---|---|---|
| 4,659,264 A | | 4/1987 | Friedline |
| 4,699,549 A | * | 10/1987 | Shimomura et al. ............ 407/42 |
| 4,759,667 A | * | 7/1988 | Brown .......................... 408/230 |
| 5,049,011 A | * | 9/1991 | Bohnet et al. ................ 408/223 |
| 5,160,232 A | * | 11/1992 | Maier .......................... 408/223 |
| 5,203,649 A | * | 4/1993 | Katbi et al. .................. 407/114 |
| 5,221,164 A | | 6/1993 | Allaire |
| 5,443,334 A | | 8/1995 | Pantzar |
| 5,597,271 A | * | 1/1997 | Men et al. .................... 407/113 |
| 5,688,081 A | | 11/1997 | Paya |
| 5,718,540 A | | 2/1998 | Satran et al. |
| 5,720,583 A | | 2/1998 | Bohnet et al. |
| 5,921,723 A | | 7/1999 | Satran et al. |
| 5,957,629 A | | 9/1999 | Hessman et al. |
| 5,971,672 A | * | 10/1999 | Hansson ....................... 407/114 |
| 6,186,705 B1 | | 2/2001 | Kumar et al. |
| 6,213,691 B1 | | 4/2001 | Leeb |
| 6,599,061 B1 | * | 7/2003 | Nelson ......................... 407/114 |
| 6,669,412 B1 | * | 12/2003 | Hirose et al. ................. 407/113 |
| 6,769,844 B2 | * | 8/2004 | Waggle ........................ 407/114 |
| 7,201,542 B2 | | 4/2007 | Fritsch et al. |
| 7,338,237 B2 | * | 3/2008 | Frejd ............................ 408/230 |
| 7,351,017 B2 | | 4/2008 | Kruszynski et al. |
| D573,164 S | * | 7/2008 | Nitzsche ..................... D15/139 |
| 7,476,062 B2 | * | 1/2009 | Waggle ........................ 407/113 |
| 8,157,489 B2 | * | 4/2012 | Wolf et al. ................... 408/223 |
| 2002/0098049 A1 | * | 7/2002 | Satran et al. .................. 407/113 |
| 2003/0161696 A1 | | 8/2003 | Fritsch et al. |
| 2005/0260049 A1 | | 11/2005 | Kruszynski et al. |
| 2008/0131217 A1 | | 6/2008 | Kruszynski et al. |
| 2008/0181737 A1 | * | 7/2008 | Limell et al. ................. 408/188 |
| 2008/0304924 A1 | * | 12/2008 | Engstrom et al. ............ 407/114 |

FOREIGN PATENT DOCUMENTS

| | | | |
|---|---|---|---|
| DE | 100 21 879 A1 | | 11/2001 |
| DE | 102 35 606 A1 | | 2/2004 |
| EP | 0 373 292 A1 | | 6/1990 |
| EP | 0 582 222 A1 | | 2/1994 |
| EP | 582222 A1 | * | 2/1994 |
| JP | 59076709 A | * | 5/1984 |
| JP | 62130107 A | * | 6/1987 |
| JP | 9-290312 | | 11/1997 |
| JP | 2001277022 A | * | 10/2001 |
| JP | 2009202239 A | * | 9/2009 |
| JP | 2009279672 A | * | 12/2009 |
| JP | 2010099778 A | * | 5/2010 |
| WO | WO 93/11898 | | 6/1993 |
| WO | WO 94/16848 | | 8/1994 |
| WO | WO 95/19238 | | 7/1995 |
| WO | WO 96/30149 | | 10/1996 |
| WO | WO 00/50192 | | 8/2000 |

OTHER PUBLICATIONS

Form PCT/IPEA/409 dated Jul. 19, 2008 (11 pages).
Form PCT/ISA/210 dated Dec. 13, 2007 (5 pages).
German Patent Office Search Report dated Mar. 15, 2007 (4 pages).

* cited by examiner

INDEXABLE INSERT AND USE OF THE INDEXABLE INSERT IN A SOLID DRILL

The invention relates to an indexable insert for solid drills, having a supporting base, four lateral supporting surfaces projecting beyond the supporting base, and four identical cutting edges which are arranged at a vertical distance above the supporting base, extend between, in each case, two cutting-edge corners, are bounded by a respective tool face and a tool flank and of which in each case one is located in an active use position during the drilling operation, in the case of which the tool flank, at each point of the associated cutting edge, encloses a clearance angle with a straight line perpendicular to the supporting base.

Drilling tools having at least two essentially square indexable inserts of this type are known (DE-100 21 879 A1, DE-102 35 606 A1). The square inserts in these documents are arranged at different radial distances from one another in a basic body. They project axially beyond the drill body with a positive rake angle by way of their active end cutting edges. The inner insert usually provides initial cutting in the axial direction, the spacing corresponding approximately to the radius of curvature in the region of the cutting-edge corners. The active main cutting edge of the innermost indexable insert may project beyond the drill axis, in which case precautions have to be taken in order to avoid overloading the cutting-edge corner. It is indeed known to vary the positioning of the indexable inserts in the basic body and the circumferential contour thereof, in order to influence the cutting operation and the chip formation. However, these precautions are limited since design restrictions are necessary for the fourfold symmetry of the insert in the cutting-edge region and since the insert seat, in order to achieve sufficient chucking accuracy, allows only relatively straightforward outline shapes. On the other hand, the geometrical conditions from the inside to the outside mean that a drilling operation using solid drills of this type gives rise to different cutting speeds, which result in variable wear along the active cutting edges of the known indexable inserts. Moreover, using square indexable inserts, in contrast to the known trigonal inserts with an arrow-like cutting edge, gives rise, in particular during initial drilling operation, to problems in centering the drill, and it has not been possible to solve these problems sufficiently using prior-art measures.

Taking this as the departure point, the object of the invention is to develop a quadrilateral indexable insert which is derived from a square indexable insert and which makes it possible to improve both the cutting properties and the centering and wear behavior of solid drills.

The combinations of features in the present invention are proposed in order to achieve this object. Advantageous configurations and developments of the invention can be gathered from the dependent claims.

The solution according to the invention is based on the idea that varying the geometry along the cutting edges provides additional parameters for optimizing the cutting properties. This applies according to the invention, in particular, to the parameters relating to the height of the four cutting edges, as measured from the plane of the supporting base, and to the clearance angle, which can be varied either individually or together over the length of the cutting edges to optimize the local cutting properties.

A preferred configuration of the invention provides that the height of the cutting edges, as measured from the plane of the supporting base, ascends from one cutting-edge corner en route to a cutting-edge portion of maximum height and decreases as the other cutting-edge corner is approached. The height profile of the cutting edge between the two cutting-edge corners here is adapted to the cutting conditions along the cutting edges, and is therefore expediently asymmetrical. The cutting-edge portion of maximum height is advantageously displaced in the direction of one of the two cutting-edge corners. Moreover, the ascents of the cutting edge from the two cutting-edge corners to the cutting-edge portion of maximum height are non-linear. In particular, the ascent of the cutting edge from one cutting-edge corner may be steeper than that from the other cutting-edge corner. It is thus possible to influence the centering action of the drilling tool during an initial drilling operation and also to influence the radial drifting of the drilling tool. The ascent portions of the cutting edge are advantageously connected to one another via an elongate cutting-edge portion of maximum height.

The further variation parameter according to the invention, that is to say the clearance angle, makes it possible to achieve, in particular, an increase in strength in the cutting-edge-corner region while simultaneously improving the cutting properties in the range of relatively high cutting speeds during the drilling operation if the clearance angle increases from a relatively small value in the vicinity of the cutting-edge corner to a maximum value and decreases over the rest of the cutting edge as far as the other cutting-edge corner. As the clearance angle increases, the wedge angle of the cutting edge, and thus the cutting resistance, can be reduced. Adaptation to the cutting and compressive forces occurring in the region of the cutting-edge corners can be achieved in that the cutting edge is rounded in the region of the cutting-edge corner, and in that the clearance angle varies over the course of the cutting-edge corner. Moreover, the increase in the clearance angle along the cutting edge is more pronounced from the one cutting-edge corner than from the other cutting-edge corner. Furthermore, it has been found that the cutting-edge portion of maximum clearance angle is expediently arranged outside the cutting-edge center between two cutting-edge corners. In order to reduce the cutting resistance, the clearance angle expediently assumes its maximum value along an elongate cutting-edge portion. If an approximately constant rake angle is assumed over the cutting-edge length, the wedge angle enclosed along the cutting edge between the tool face and tool flank will vary, according to the invention, along the cutting edge in the opposite direction to the clearance angle. Accordingly, the wedge angle in the portion with the maximum values for the cutting-edge height and/or the clearance angle will be smaller than in the region of the cutting-edge corners.

A further preferred configuration of the invention provides that the cutting-edge height and/or the clearance angle vary/varies in a wave-like manner along the cutting edge. Advantageously in each case at least two, preferably three to five, variation waves of this type are provided along the cutting edge. These measures result in the cutting edge being lengthened and in the chip formation being improved.

As long as the tool flanks can be realized by geometrically straightforward shapes, it is advantageous if the supporting surfaces, by means of which the indexable inserts are supported in their insert seats, are formed, at least in part, by the tool flanks of the associated non-active cutting edges. In the case of geometrically complicated tool flanks, however, it is advantageous if the supporting surfaces together with the supporting base form a unitary supporting portion, while the tool flanks with the cutting edges and the tool faces form a cutting portion, which is connected to the supporting portion via a pyramidal transition portion. In order, despite relatively large production tolerances, to achieve better fitting accuracy between the indexable insert and the insert seat, it is proposed, according to an advantageous configuration of the invention, that the supporting surfaces are connected to the supporting base via a pyramidally tapering transition portion. The supporting base here expediently has a square outline, while the supporting surfaces bound a cuboid or truncated pyramid with a square surface area.

The indexable inserts according to the invention are preferably used as inner inserts of a solid drill having at least two radially and circumferentially spaced-apart insert seats which partially overlap in the radial direction. The indexable inserts according to the invention with a wave-like profile of the cutting edges or a wave-like profile of the clearance angles along the cutting edges are preferably used as outer inserts of a solid drill having at least two radially and circumferentially spaced-apart insert seats which partially overlap in the radial direction.

The invention will be explained in more detail hereinbelow with reference to a few exemplary embodiments illustrated schematically in the drawing, in which:

FIG. 1b shows a plan view of the solid drill according to FIG. 1a;

Figure 1A:
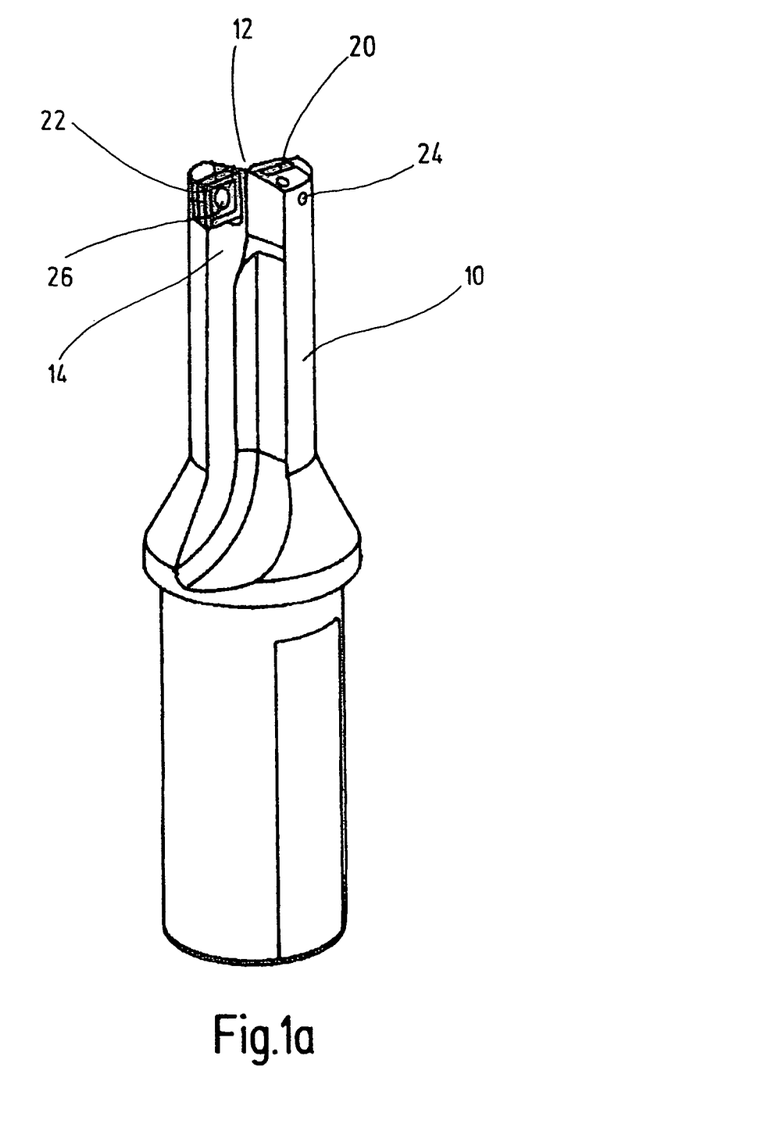
FIG. 1a shows a diagrammatic illustration of a solid drill for machine tools having essentially square indexable inserts.
Figure 1B:
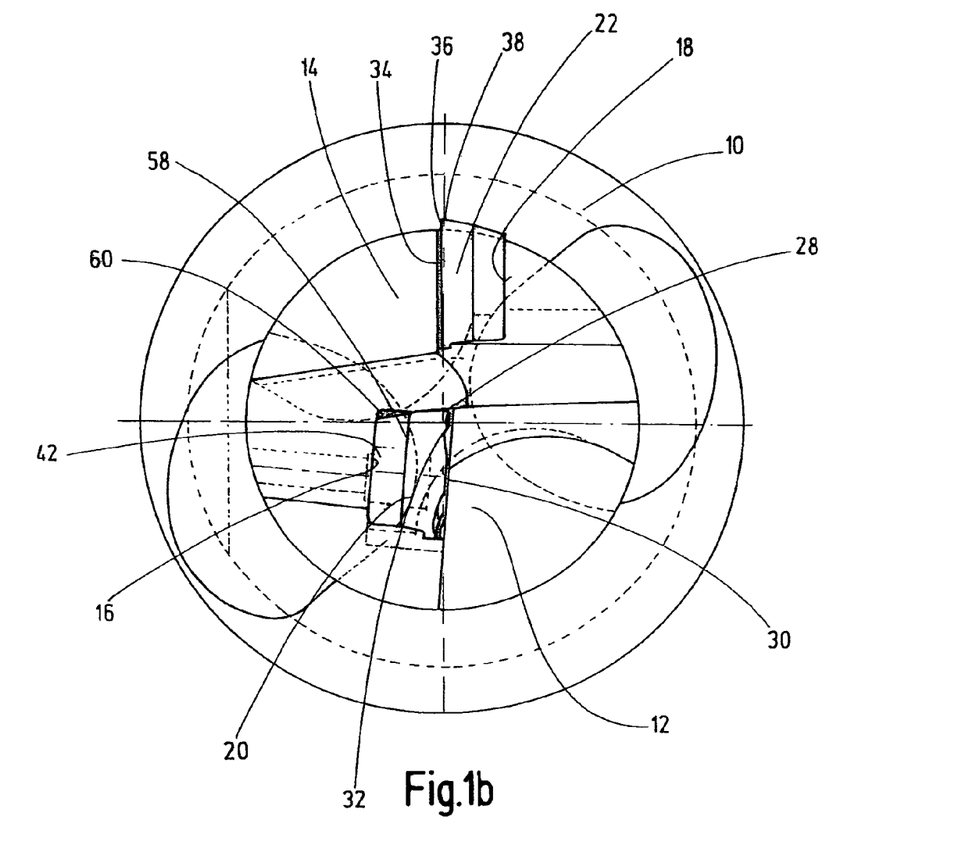

The tool which is illustrated in FIGS. 1a and b is intended as a solid drill for machine tools. It has an essentially cylindrical drill body 10 provided with two chip flutes 12, 14. Provided at the end of the chip flutes is a respective insert seat 16, 18 for accommodating a respective indexable insert 20, 22 of essentially square outline. The indexable inserts are fastened on the drill body 10 by a respective countersunk head screw (not illustrated) which engages in a threaded bore 24 in the drill body 10. As can be seen from FIG. 1b, the inner indexable insert 20 engages over the drill axis 32 by way of the inner cutting-edge corner 28 of its active end cutting edge 30, while the outer indexable insert 22 with its active cutting edge 34 projects beyond the circumference of the drill body 10 in the region of the outer cutting-edge corner 36 by way of its outer secondary cutting edge 38.

One special feature of the invention is that in particular the inner insert 20 of the drilling tool is adapted optimally to the cutting conditions which occur during the drilling operation. The indexable insert 20 provided for this purpose is fitted precisely into the associated insert seat 16 of the drill body 10 by way of its supporting base 42 and at least two of the four lateral supporting surfaces 44 which project beyond the supporting base. It has four identical cutting edges 30 which are arranged at a distance above the supporting base 42, extend between in each case two cutting-edge corners 28', 28", are bounded by a respective tool face 46 and a tool flank 48, with the inclusion of angle α, and of which in each case one is located in an active use position during the drilling operation. The tool flank 48, at each point of the associated cutting edge 30, encloses a clearance angle α with a straight line 52 perpendicular to the supporting base (cf. FIGS. 4a to c).

Adaptation to the cutting conditions within the drilling tool takes place, in the case of the exemplary embodiments shown in the groups of figures in FIGS. 2 to 7, in that the height h of the four cutting edges 30, as measured from the plane of the supporting base 42, and/or the clearance angle α vary/varies along the cutting edges.

Figure 2A:
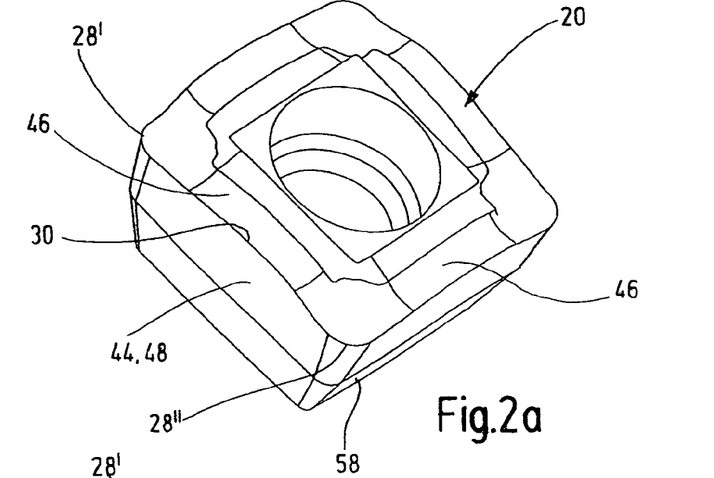
FIGS. 2a to c show a diagrammatic illustration, a plan view and a side view of a first variant of an indexable insert.
Figure 2B:
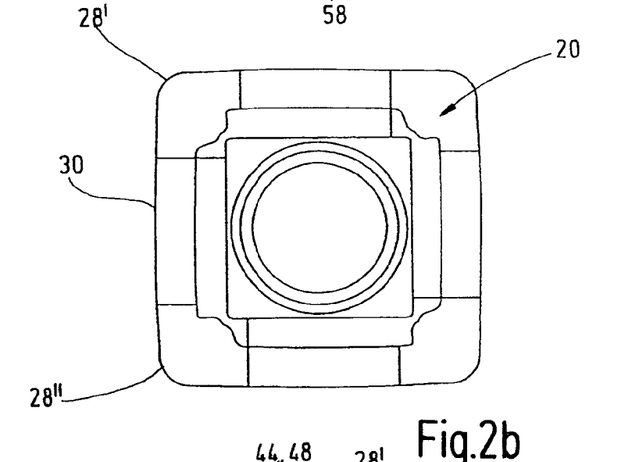
Figure 2C:
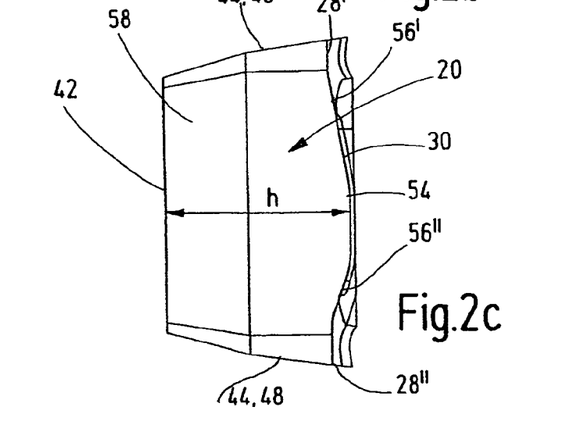

In the case of the exemplary embodiment which is shown in FIGS. 2a to c, the height h of the cutting edges 30, as measured from the plane of the supporting base 42, ascends from a first cutting-edge corner 28' en route to a cutting-edge portion 54 of maximum height and decreases as the second cutting-edge corner 28" is approached. As can be seen, in particular, from FIG. 2c, the height profile of the cutting edge 30 is asymmetrical. The cutting-edge portion 54 of maximum height is displaced in the direction of the cutting-edge corner 28". It is also the case that the ascents of the cutting edge 30 to the cutting-edge portion 54 of maximum height are non-linear. They are steeper from the cutting-edge corner 28" than from the second cutting-edge corner 28'. The cutting-edge portion 54 of maximum height is located between the two ascent portions 56', 56"; it is elongate (cf. FIG. 2c). The variant according to FIGS. 2a to c has a clearance angle α which is constant over the cutting edge 30 between the cutting-edge corners. Accordingly, the tool flanks 48 are supplemented via the rounded insert corners to form a straightforward body in the form of a truncated pyramid. The tool flanks 48 are therefore suitable, at the same time, as supporting surfaces 44 for providing support in the insert seat 16. The supporting surfaces 44 are connected to the supporting base 42 via a pyramidally tapering transition portion 58. The transition portion 58 still leaves some clearance 60 in the direction of the insert seat, in order to minimize the requirements which have to be met by the production tolerances of the insert seat and of the indexable inserts.

Figure 3A:
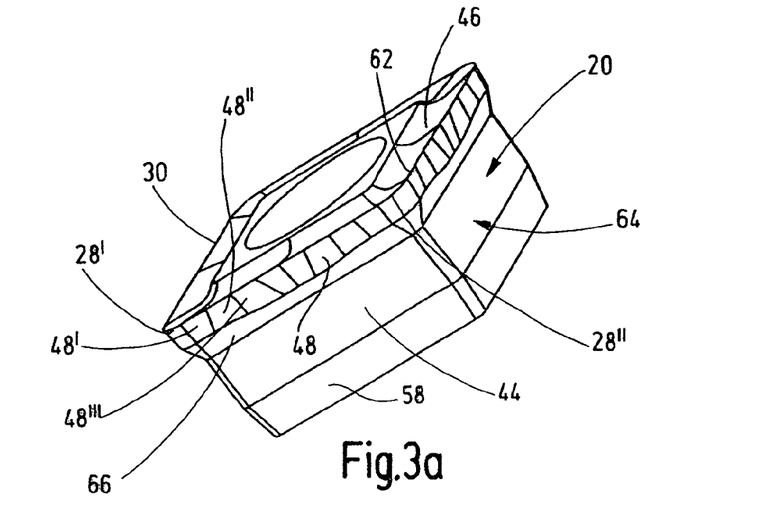
FIGS. 3a to c show a diagrammatic illustration, a side view and a plan view of a second variant of an indexable insert.
Figure 3B:
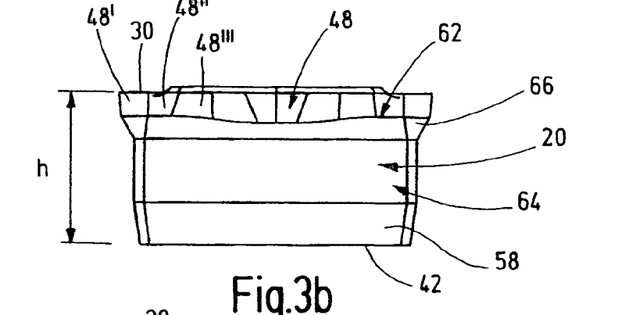
Figure 3C:
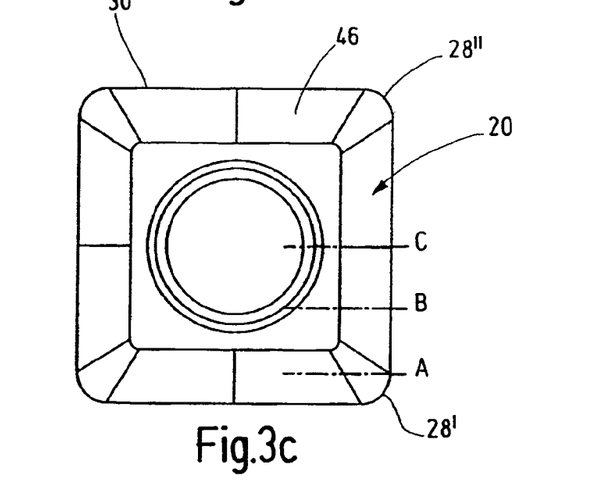
Figure 4A:
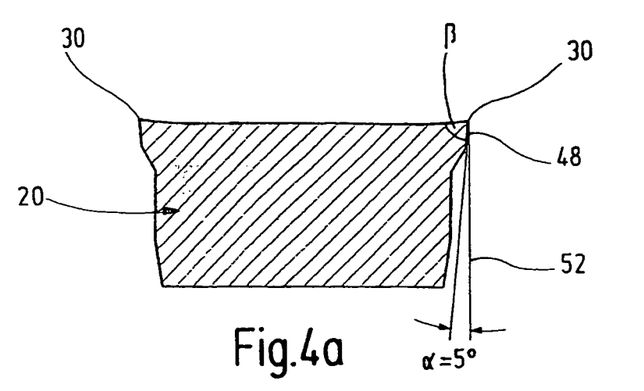
FIGS. 4a to c each show a section along section lines A, B and C from FIG. 3c.
Figure 4B:
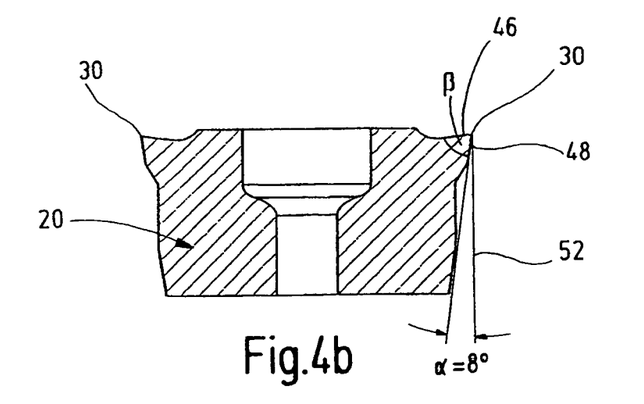
Figure 4C:
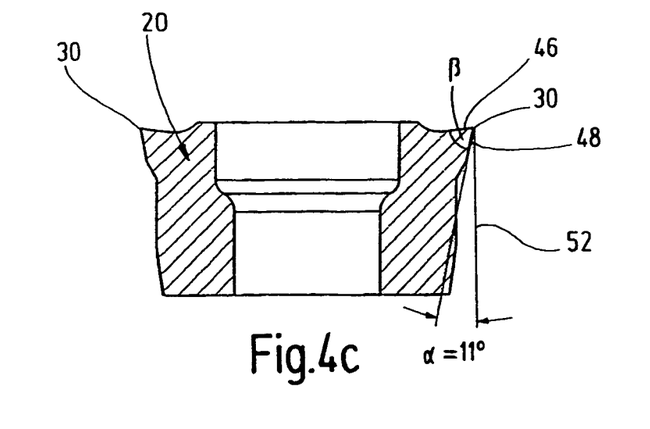

The exemplary embodiment which is shown in the groups of figures in FIGS. 3 and 4 differs from the exemplary embodiment according to the group of figures in FIG. 2, in particular, in that the height of the cutting edges 30, as measured from the plane of the supporting base 42, is constant over the length of the cutting edges as far as the cutting-edge corners 28', 28", and in that, instead, the clearance angle α varies along the cutting edges. This variation is indicated in FIGS. 3a and b by transition lines 62 between different tool-flank portions 48', 48", 48"', etc. The clearance angle can be gathered in quantitative terms from the sections which are shown in FIGS. 4a to c and of which the positions along the cutting edge 30 can be seen in FIG. 3c. In the case of the exemplary embodiment shown, the clearance angle α in the region of the cutting-edge corner 28' is 5° (FIG. 4a) and increases along the cutting edge 30 via 8° (FIG. 4b) to 11° (FIG. 4c), in order to decrease again from there to the second cutting-edge corner 28". Since the rake angle along the cutting edge 30 is more or less constant, the variable clearance angle α results in a corresponding variation in the wedge angle β. Accordingly, there is a relatively large wedge angle in the region of the cutting-edge corners 28', 28", which increases the cutting-edge stability in the corner region. The wedge angle β decreases toward the center. The cutting edge is thus sharper there, which results in a reduction in the cutting forces.

Figure 5A:
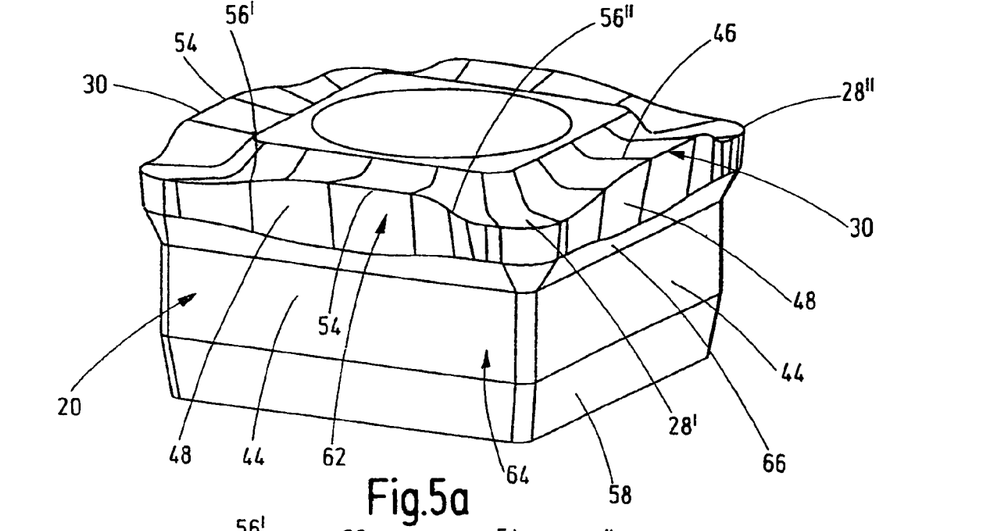
FIGS. 5a to c show a diagrammatic illustration, a side view and a plan view of a third variant of the indexable insert.
Figure 5B:
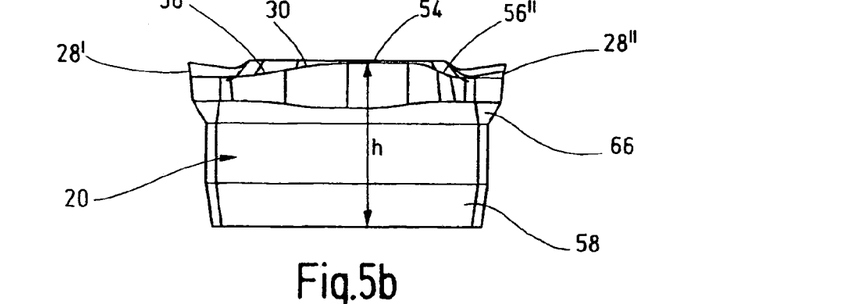
Figure 5C:
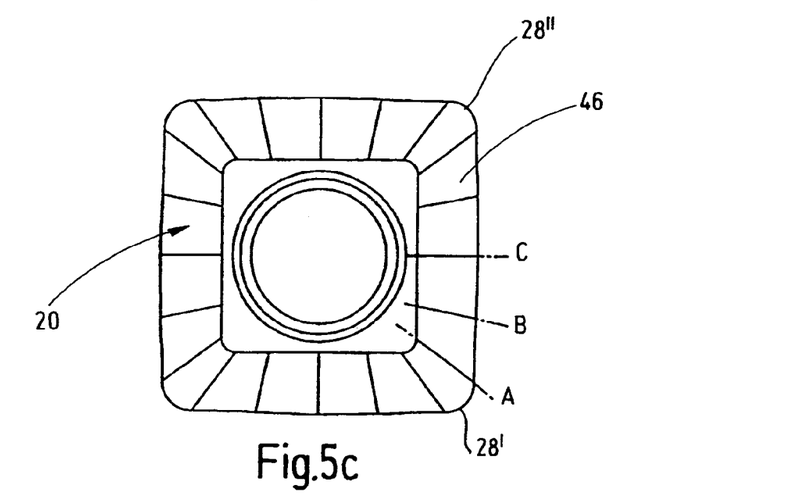
Figure 6A:
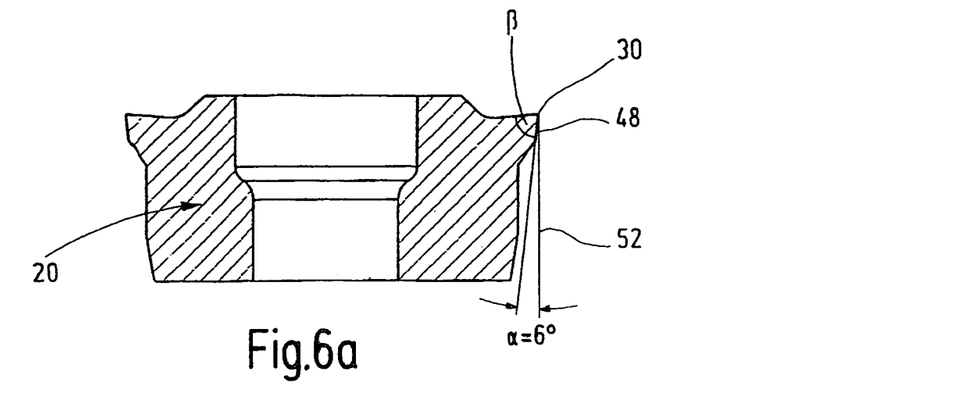
FIGS. 6a to c each show a section along section lines A, B and C from FIG. 5c.
Figure 6B:
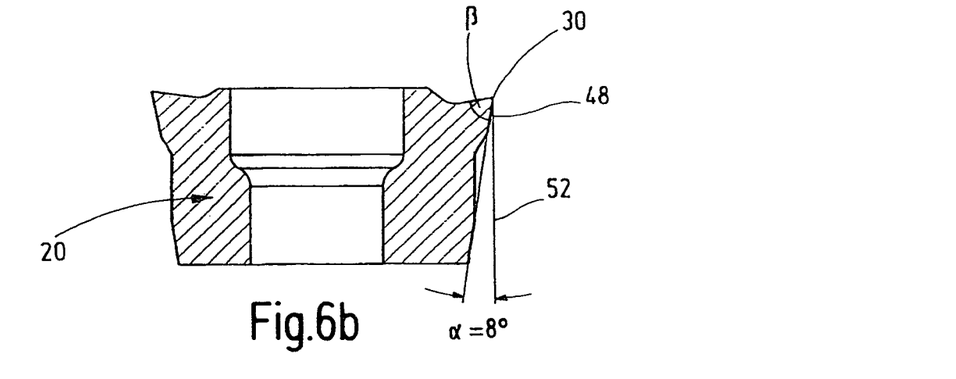
Figure 6C:
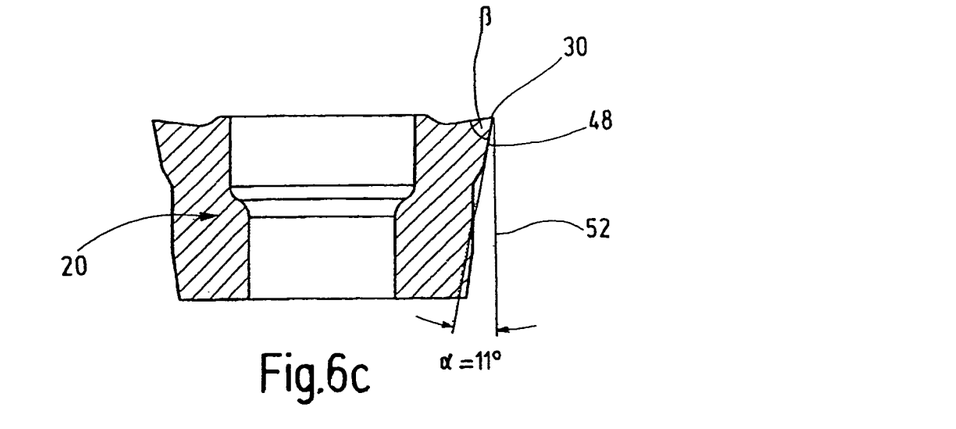

The exemplary embodiment which is shown in the groups of figures in FIGS. 5 and 6 makes use of both variation parameters cutting-edge height h and clearance angle α along the cutting edges 30. As can be seen, in particular, in FIGS. 5a and *b*, in the case of the indexable insert which is shown there, the cutting-edge height varies over the length of the cutting edges in a manner similar to the case of the exemplary embodiment according to FIG. 2a. FIGS. 6a to *c*, in conjunction with FIG. 5c, show that, at the same time, the clearance angle α also increases from 6° in the region of the cutting-edge corner 28', via 8° in the ascent region, to 11° in the cutting-edge portion 54 of maximum height. Over the rest of the cutting edge 30, the clearance angle α decreases again in the direction of the second cutting-edge corner 28". Since the tool flanks 48 of variable clearance angle α over the cutting-edge length are of complicated geometrical configuration, they are not suitable as supporting surfaces within a geometrically straightforward insert seat. Accordingly, both in the case of the second variant according to FIGS. 3a to *c* and in the case of the third variant according to FIGS. 5a to *c*, the indexable insert 20 is subdivided along its height into a cutting portion 62 and a supporting portion 64. The supporting portion 64 has smooth supporting surfaces 44 which are supplemented via the rounded insert corners to form a body in the form of a cuboid or truncated pyramid. A transition portion 66 in the form of a truncated pyramid is located between the cutting portion 62 and the supporting portion 64, while a further transition portion 58 in the direction of the supporting base 42 ensures the avoidance of tolerance problems for the necessary clearance 60 in the insert seat 36.

Figure 7A:
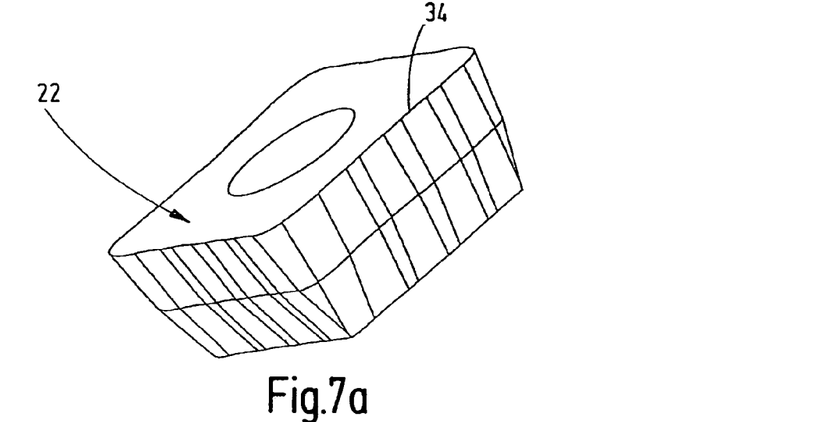
FIGS. 7a to c show a diagrammatic illustration, a plan view and a side view of a fourth variant of the indexable insert.
Figures 7B, 7C, 7D:
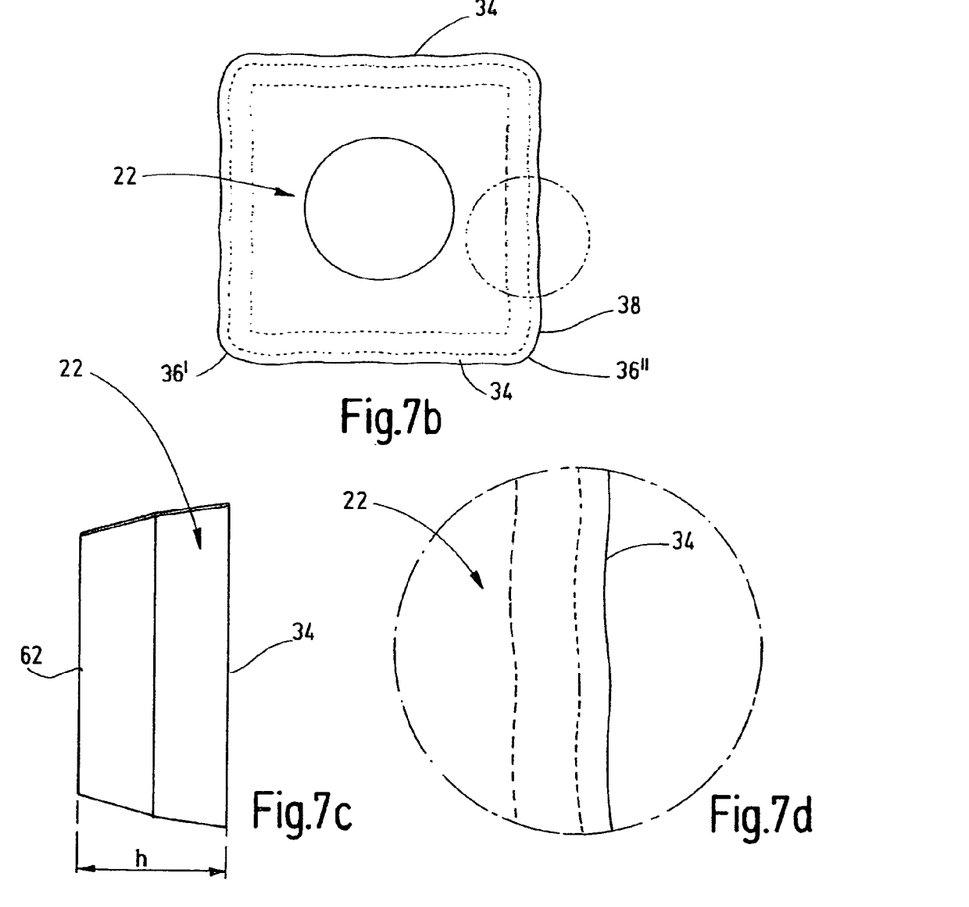
FIG. 7d shows an enlarged detail from FIG. 7b.

The three variants described above are suitable, in particular, as inner indexable inserts 20 in a drilling tool, while the exemplary embodiment which is shown in the group of figures in FIG. 7 is designed for use as an outer indexable insert 22 in the drilling tool. In the case of the last-mentioned exemplary embodiment, the cutting edges 30 are spaced apart from the supporting base 42 by a constant distance h over their length, while the clearance angle α varies in wave form. The cutting-edge corners 36', 36" are rounded asymmetrically, in which case the radius-defining part of the rounded cutting-edge corners of the main cutting edge 34 merges into an elongate secondary cutting edge 38. These topographical measures, in particular, improve the chip formation and the drilling quality and, at the same time, stabilize the insert corners 36', 36'.

Figure 8A:
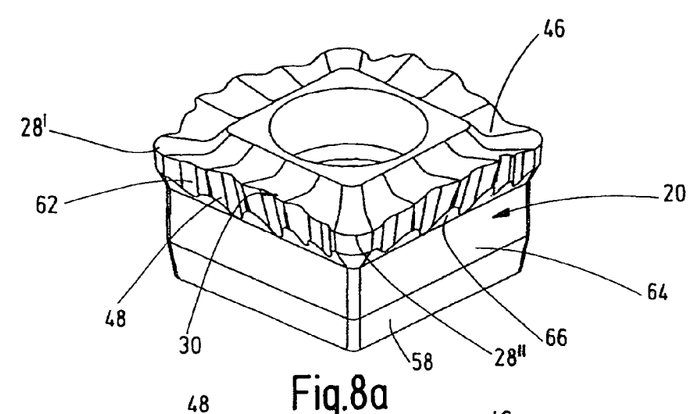
FIGS. 8a to c show a diagrammatic illustration, a side view and a plan view of a fifth variant of the indexable insert.
Figure 8B:
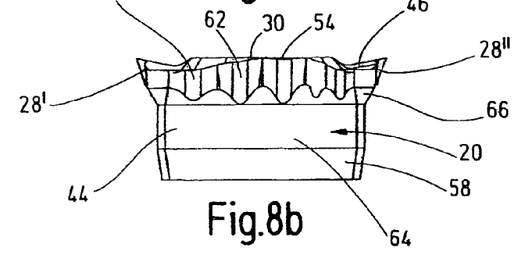
Figure 8C:
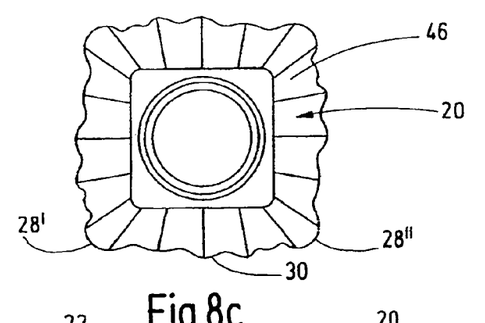

The exemplary embodiment which is shown in FIGS. 8a to *c* combines the wave-form variation of the clearance angle α with the variation in height of the cutting edges 30 in relation to the supporting base 42. These measures result, in particular, in an improvement in the chip formation both in the region of the inner insert 20 and in the region of the outer insert 22 of a drilling tool.

Figure 9A:
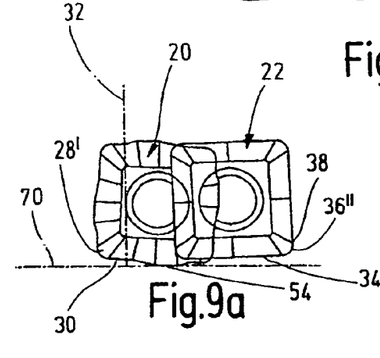
FIGS. 9a and b show schematic illustrations of the indexable inserts of a drilling tool with the outer insert swung over through 180° in order to demonstrate the insert overlapping.

In FIGS. 9a and *b*, an inner insert 20 and an outer insert 22 are combined with one another in a drilling tool, and, in order to illustrate the overlapping on both sides, the outer insert 22 has been swung through approximately 180° into the plane of the inner insert 20. The same indexable inserts are used in both drilling tools. In the case of FIG. 9a, the inserts have been moved closer together than in FIG. 9b. Accordingly, the configuration which is shown in FIG. 9a is intended for drilling smaller diameters than the configuration according to FIG. 9b. The chain-dotted line 32 indicates in each case the drill axis, while the chain-dotted line 70 indicates the workpiece surface during initial drilling operation. It can be seen from FIGS. 9a and *b* that the inner insert 20 is axially advanced in relation to the outer insert 22, and that the inner part of the outer insert 22 is covered over by the outer part of the inner insert 20. Accordingly, the inner corner 36' of the active cutting edge 24 of the outer insert 22 is protected against wear by the outer corner 28" of the inner insert 20. This is necessary because, on the outer insert 22, the radius-defining outer corner 36" has its secondary cutting edge 38 engaging beneath the bore on the workpiece and therefore has to be protected on the side of the inner cutting-edge corners 36', 36" in a later indexing operation.

Figure 9B:
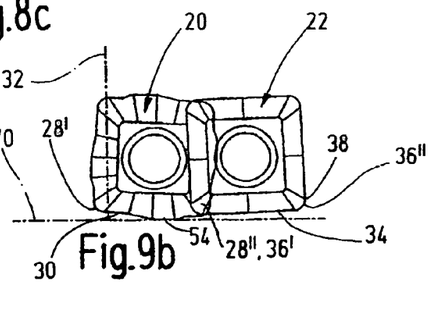

It can also be seen from FIGS. 9a and *b* that, during the drilling operation, the cutting-edge portion 54 ensures production of an initial impression in the workpiece 70 and thus makes a significant contribution to centering the tool in the workpiece. The inner cutting edge 28' of the inner indexable insert 20 engages over the drill axis 32 and thus does not make any contribution to the cutting operation. Rather, on account of its arrangement in the drill, this corner is protected against wear for a subsequent indexing operation.

In summary: the invention concerns an indexable insert for solid drills, having four identical cutting edges 30 which are arranged at a distance above a supporting base 42 and extend between in each case two cutting-edge corners 28', 28". The cutting edges are bounded, with the inclusion of a wedge angle β, by a respective tool face 46 and a tool flank 48. Of the cutting edges 30, in each case one is located in an active use position during the drilling operation. In order to allow optimum adaptation to the drilling properties and cutting conditions, which vary over the cutting-edge length of the drilling tool, it is proposed, according to the invention, that the height h of the four cutting edges 30, as measured from the plane of the supporting base 42, and/or the clearance angle α vary/varies over the length of the respective cutting edges 30.

The invention claimed is:

1. An indexable insert for solid drills, having a supporting base (42), having four lateral supporting surfaces (44) projecting beyond the supporting base, and having four identical cutting edges (30) which are arranged at a distance above the supporting base (42), extend between in each case two cutting-edge corners (28, 28"), are bounded by a respective tool face (46) and a tool flank (48) and of which in each case one is located in an active use position during the drilling operation, in the case of which the tool flank (48), at each point of the associated cutting edge (30), encloses a clearance angle (α) with a straight line (52) perpendicular to the supporting base (42), the clearance angle (α) varying along the cutting edge (30), characterized in that the clearance angle (α) increases from a relatively small value in the region of the cutting-edge corner (28') to a maximum value and decreases over the rest of the cutting edge (30) as far as the other cutting-edge corner (28"), and in that the increase in the angle values from small to maximum value from one of the cutting-edge corners (28") is more pronounced than from the other cutting-edge corner (28').

2. The indexable insert as claimed in claim 1, characterized in that the cutting edge (30) is rounded in the region of the cutting-edge corners (28', 28"), and in that the clearance angle (α) varies over the course of the cutting-edge corner.

3. The indexable insert as claimed in claim 1, characterized in that the cutting-edge portion (54) with maximum clearance angle (α) is arranged outside the cutting-edge center.

4. The indexable insert as claimed in claim 1, characterized in that the clearance angle (α) assumes its maximum value along an elongate cutting-edge portion (54).

5. The indexable insert as claimed in claim 1, characterized in that the wedge angle (β) enclosed along the cutting edge (30) between the tool face (46) and tool flank (48) varies along the cutting edge (30).

6. The indexable insert as claimed in claim 5, characterized in that the wedge angle (β) in the cutting-edge portion (54) of maximum cutting-edge height (h) and/or maximum clearance angle (α) is smaller than in the region of the cutting-edge corners (28', 28").

7. The indexable insert as claimed in claim 1, characterized in that the height (h) of the cutting edges (30), as measured from the plane of the supporting base (42), varies over the length of the cutting edges.

8. The indexable insert as claimed in claim 7, characterized in that the height (h) of the cutting edges (30), as measured from the plane of the supporting base (42), ascends from one cutting-edge corner (28') en route to a cutting-edge portion (54) of maximum height (h) and decreases as the other cutting-edge corner (28") is approached.

9. The indexable insert as claimed in claim 8, characterized in that the height profile of the cutting edges (30) between the two cutting-edge corners (28', 28") is asymmetrical.

10. The indexable insert as claimed in claim 8, characterized in that the cutting-edge portion (54) of maximum height (h) is displaced in the direction of one of the two cutting-edge corners.

11. The indexable insert as claimed in claim 7, characterized in that the ascents of each cutting edge (30) from the cutting-edge corners (28', 28") to the cutting-edge portion (54) of maximum height (h) are non-linear.

12. The indexable insert as claimed in claim 7, characterized in that the ascent of each cutting edge (30) from the one cutting-edge corner (28") is steeper than from the other cutting-edge corner (28').

13. The indexable insert as claimed in claim 7, characterized in that the ascent portions (56', 56") of the cutting edge (30) are connected to one another via an elongate cutting-edge portion (54) of maximum height.

14. The indexable insert as claimed in claim 1, characterized in that the clearance angle (α) and/or the cutting-edge height (h) vary/varies in a wave-like manner along the cutting edge (30).

15. The indexable insert as claimed in claim 14, characterized in that in each case at least two variation waves are provided along the cutting edge (30).

16. The indexable insert as claimed in claim 1, characterized in that the supporting surfaces (44) are formed, at least in part, by the tool flanks (48) of the associated non-active cutting edges (30).

17. The indexable insert as claimed in claim 16, characterized in that the supporting surfaces (44) are connected to the supporting base (42) via a pyramidally tapering transition portion (58).

18. The indexable insert as claimed in claim 16, characterized in that the supporting base (42) has a square outline.

19. The indexable insert as claimed in claim 16, characterized in that the supporting surfaces (44) bound a cuboid or a truncated pyramid with a square surface area.

20. The indexable insert as claimed in claim 1, characterized in that the supporting surfaces (44) together with the supporting base (42) form a supporting portion (64), while the tool flanks (48) with the cutting edges (30) and the tool faces (46) form a cutting portion (62), which is connected to the supporting portion (64) via a preferably pyramidal transition portion (66).

21. The indexable insert as claimed in claim 1 as an outer insert (22) of a solid drill having at least two radially and circumferentially spaced-apart insert seats (36) which partially overlap in the radial direction.

22. An inner insert (20) of a solid drill having at least two radially and circumferentially spaced-apart insert seats (36), which partially overlap in the radial direction, comprising an indexable insert for solid drills, having a supporting base (42), having four lateral supporting surfaces (44) projecting beyond the supporting base, and having four identical cutting edges (30) which are arranged at a distance above the supporting base (42), extend between in each case two cutting-edge corners (28, 28"), are bounded by a respective tool face (46) and a tool flank (48) and of which in each case one is located in an active use position during the drilling operation, in the case of which the tool flank (48), at each point of the associated cutting edge (30), encloses a clearance angle (α) with a straight line (52) perpendicular to the supporting base (42), the clearance angle (α) varying along the cutting edge (30), characterized in that the clearance angle (α) increases from a relatively small value in the region of the cutting-edge corner (28') to a maximum value and decreases over the rest of the cutting edge (30) as far as the other cutting-edge corner (28"), and in that the increase in the angle values from small to maximum value from one of the cutting-edge corners (28") is more pronounced than from the other cutting-edge corner (28').

* * * * *